US006540795B2

United States Patent
Wood et al.

(10) Patent No.: US 6,540,795 B2
(45) Date of Patent: *Apr. 1, 2003

(54) CANDLE WAX STABILIZED WITH OXAZOLIDINES

(75) Inventors: Mervin G. Wood, Poughquag, NY (US); Andrea R. Smith, Wingdale, NY (US); Deborah DeHessa, Poughkeepsie, NY (US); Sai Ping Shum, Jamesburg, NJ (US)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/824,141

(22) Filed: Apr. 2, 2001

(65) Prior Publication Data

US 2003/0000128 A1 Jan. 2, 2003

(51) Int. Cl.$^7$ .................................................. C11C 5/00
(52) U.S. Cl. ......................................... 44/275; 431/288
(58) Field of Search ............................ 44/275; 431/288

(56) References Cited

U.S. PATENT DOCUMENTS

| | | | |
|---|---|---|---|
| 3,530,084 A | 9/1970 | Potts | 260/28.5 |
| 3,707,541 A | 12/1972 | Lajiness | 260/244 |
| 3,825,555 A | 7/1974 | Lajiness | 260/307 |
| 4,017,406 A | 4/1977 | Brois et al. | 252/51.5 |
| 4,104,254 A | 8/1978 | Lai | 260/45.8 |
| 4,116,643 A | 9/1978 | Ryer et al. | 44/63 |
| 4,125,518 A | 11/1978 | Susi | 260/45.8 |
| 4,369,118 A | 1/1983 | Ryer et al. | 252/39 |
| 4,379,721 A | 4/1983 | Qualitz et al. | 106/21 |
| 4,616,051 A | 10/1986 | Paolino | 524/102 |
| 5,001,233 A | 3/1991 | Murray et al. | 540/29 |
| 5,223,174 A | 6/1993 | Chou et al. | 252/194 |
| 5,264,148 A | 11/1993 | Chou et al. | 252/194 |
| 5,328,635 A | 7/1994 | Chou et al. | 252/194 |
| 5,433,891 A | 7/1995 | Chou et al. | 252/321 |
| 5,879,694 A | 3/1999 | Morrison et al. | 424/405 |
| 5,964,905 A | 10/1999 | Camp et al. | 44/275 |
| 6,262,153 B1 * | 7/2001 | Webster | 524/99 |
| 6,296,674 B1 * | 10/2001 | Trainor et al. | 44/278 |

FOREIGN PATENT DOCUMENTS

| | | |
|---|---|---|
| EP | 0005922 | 12/1979 |
| EP | 0359488 | 3/1990 |
| EP | 0133964 | 7/1990 |
| JP | 3278554 | 12/1991 |
| WO | 94/13736 | 6/1994 |
| WO | 98/11181 | 3/1998 |
| WO | 99/05108 | 2/1999 |
| WO | 00/14177 | 3/2000 |
| WO | 00/22037 | 4/2000 |

OTHER PUBLICATIONS

F. Ballentine et al., "Inhibiting Color Fading of Dyed Candles with Cyasorb® Light Absorbers", The National Candle Association Technical Meeting, Apr. 16, 1998.
Abstract for JP 3278554 (1991).
Ullmann's Encyclopedia of Industrial Chemistry, vol. A5, pp. 29–30.
R. van der Vennet, Candle Association Meeting in Houston, (1994), "Antioxidants in Wax—Replacement of BHT"—Described in WO 94/13736.

* cited by examiner

*Primary Examiner*—Margaret Medley
(74) *Attorney, Agent, or Firm*—Tyler A. Stevenson; Luther A. R. Hall

(57) ABSTRACT

White, dyed, dipped, unscented and/or scented candle wax is effectively stabilized against discoloration and fading by the incorporation therein of an oxazolidine in combination with a UV absorber and/or an antioxidant.

20 Claims, No Drawings

CANDLE WAX STABILIZED WITH OXAZOLIDINES

The instant invention pertains to white, dyed, dipped, unscented and/or scented candle wax which is effectively stabilized against discoloration and fading by the incorporation therein of an oxazolidine in combination with a UV absorber and/or an antioxidant.

BACKGROUND OF THE INVENTION

Candles have been known for many centuries going back to the eighth century B.C. The nature of candles is described in Ullmann's Encyclopedia of Industrial Chemistry, Volume A5 at pages 29–30 where it is seen that candles are made from paraffin, beeswax and stearin as basic materials, and where a host of additives may also be present.

It is not surprising that with candles and wax becoming increasingly more important attention was paid as to how to stabilize the said materials. At the National Candle Association Meeting in Houston, 1994, R. van der Vennet presented a paper on "Antioxidants in Wax—Replacement of BHT" touting the use of Vitamin E (tocopherol) as an antioxidant to prevent the yellowing of wax when oxidized. WO 94/13736 describes the same invention.

EP 359,488 A3 and EP 133,964 B1 describe stabilized waxes used in cosmetics where the waxes are the same or similar to those used in candles.

EP 5,922 A1 describes lip cosmetics where the waxes are useful in lipsticks and are related to those useful in candles.

U.S. Pat. No. 5,879,694 describes in detail transparent gel candles both in composition and structure. The use of BHT as an antioxidant is mentioned.

At the National Candle Association Technical Meeting on Apr. 16, 1998, F. A. Ballentine et al., presented a paper entitled "Inhibiting Color Fading of Dyed Candles with CYASORB® Light Absorbers" in which the general theories of thermal oxidation and photodegradation are discussed along with data on the effect of light absorbers on color stability of dyed candle waxes. The light absorbers compared are 4-octyloxy-2-hydroxy-benzophenone UV-531; 4-methoxy-2hydroxybenzophenone UV-9; 2-(2-hydroxy-5-methylphenyl)-2H-benzotriazole UV-5365; 2-(2-hydroxy-5-tert-octylphenyl-2H-benzo-triazole UV-5411 and 2-(2-hydroxy-3,5-di-tert-amylphenyl)-2H-benzotriazole UV-2337).

U.S. Pat. No. 5,964,905 teaches dyed and scented candle gels containing triblock copolymers and a hydrocarbon oil of high flash point. This reference teaches that a light (UV) absorber may be used to improve the shelf stability of the candle color when exposed to visible or ultraviolet light. Two preferred absorbers are ethylhexyl p-methoxycinnamate (PARSOL® MCX, Roche) and 2-(2-hydroxy-5-tert-octylphenyl)-2H-benzotriazole (CYASORB® 5411, Cytec).

WO 00/22037 teaches the stabilization of solid, shaped and colored wax articles, including candles, using a malonate UV absorber which may optionally contain a hindered amine moiety as part of the malonate compound structure. The wax articles are dyed with a variety of oil soluble dyes and pigments. The samples protected by dimethyl p-methoxy-benzylidinemalonate exhibited better resistance to discoloration that did samples stabilized with selected benzotriazole or benzophenone UV absorbers.

Japanese Hei 3-278554 teaches that wax crayons (drawing materials) colored by organic pigments can be stabilized by a hindered amine and/or benzotriazole.

In respect to wax stabilization, the use of selected hindered amines and/or benzotriazole UV absorbers is also known in the prior art as seen in U.S. Pat. Nos. 3,530,084; 4,379,721; 4,616,051 and 5,964,905 and copending applications Ser. Nos. 09/495,495, 09/495,496 and 09/741,583.

WO 00/14177 teaches the inhibition of vinyl monomer polymerization using hindered hydroxylamines some of which may contain an oxazolidine moiety. There is no suggestion that any of these compounds would be stabilizers for candle wax.

U.S. Pat. Nos. 4,125,518 and 4,104,254 teach that 1-oxa-4-aza-spiro[4.5]decanes and other oxazolidine molecules are useful light stabilizers for polyolefins such as polypropylene.

U.S. Pat. Nos. 5,264,148 and 5,223,174 describe various mono- and bicyclic oxazolidine compounds which have the property of scavenging moisture particularly aimed at efficiently, cost effectively and safely removing water from moisture-curable polyurethane coating systems or any other water-sensitive system where residual water is a problem.

U.S. Pat. Nos. 3,707,541 and 3,825,555 describe the use of oxazolidine and tetrahydrooxazine compounds as insect repellents.

U.S. Pat. Nos. 4,017,406, 4,116,643 and 4,369,118 describe oxazoline compounds and amine salts of carboxylate half esters of 1-aza-3,7-dioxabicyclo-[3,3,0]oct-5-yl methyl alcohols as additives for lubricating oils, gasoline, middle distillate fuels and other oleaginous products.

U.S. Pat. No. 5,001,233 teaches the synthesis of hydroxylamines using dioxiranes. Cyclic hydroxylamines having oxazolidine moieties present are disclosed.

U.S. Pat. Nos. 5,328,635 and 5,433,891 disclose iminoalcohol-oxazolidine mixtures which are useful as corrosion inhibitors, moisture or formaldehyde scavengers, drying agents and the like.

WO 98/11181 describes substituted oxazolines, related to oxazolidines, which are antioxidants and antioxidant boosters capable of producing hydroperoxyl radicals.

WO 99/05108 teaches the inhibition of pulp or paper which contains lignin from yellowing by use inter alia of a substituted oxazolidine or a salt thereof.

None of these references teach the superior performance provided when the oxazolidine compounds are used in conjunction with a UV absorber and/or antioxidant to stabilize candle wax.

OBJECTS OF THE INVENTION

The object of the invention is to provide for a white and unscented; white and scented; dyed and unscented; dyed and scented; dipped and unscented; or dipped and scented candle wax stabilized by a combination of an oxazolidine compound with a UV absorber and/or antioxidant.

DETAILED DISCLOSURE

The instant invention pertains to a composition which comprises
  (a) candle wax which is white and unscented; white and scented; dyed and unscented; dyed and scented; dipped and unscented; or dipped and scented, and
  (b) an effective stabilizing amount of a combination of
    (i) an oxazolidine compound containing a moiety of generic formula I, II or III

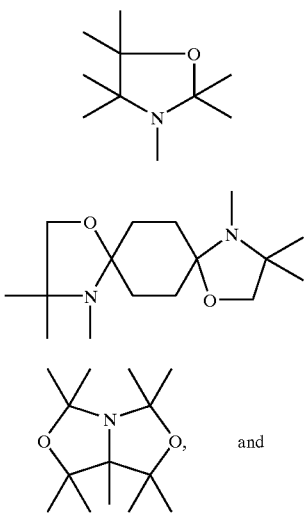

(ii) a UV absorber or an antioxidant, or a UV absorber and an antioxidant wherein the ratio by weight of (i) to (ii) is from 10:1 to 1:10.

In another embodiment of the instant invention, the oxazolidine compound of component (b)(i) is a compound of formula Ia, IIa or IIIa

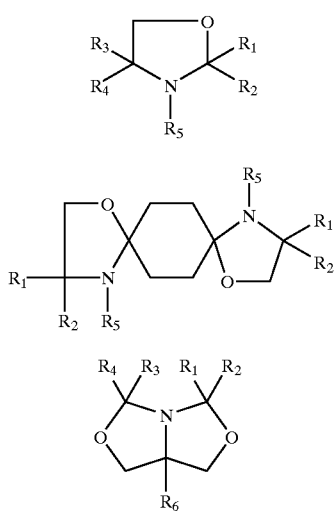

where $R_1$, $R_2$, $R_3$ and $R_4$ are independently alkyl of 1 to 12 carbon atoms, aryl of 6 to 10 carbon atoms or said alkyl substituted by one or two hydroxyl groups; or $R_1$ and $R_2$ together or $R_3$ and $R_4$ together are tetramethylene, pentamethylene or pentamethylene substituted by methyl;

$R_5$ is hydrogen, oxyl, hydroxyl, aralkyl of 7 to 15 carbon atoms, alkoxy of 1 to 24 carbon atoms, alkyl of 1 to 42 carbon atoms, said alkyl substituted by one or two hydroxyl groups, said alkyl substituted by alkylcarbonyloxy of 2 to 18 carbon atoms, or said alkyl interrupted by one to twenty oxygen atoms and substituted by one hydroxyl, by alkylcarbonyloxy of 2 to 18 carbon atoms or by 4-hydroxy-3,5-di-tert-butylbenzoyloxy, or $R_5$ is —CO—$C_nH_{2n+1}$ where n is 1 to 17, and $R_6$ is alkyl of 1 to 12 carbon atoms, aralkyl of 7 to 15 carbon atoms, aryl of 6 to 10 carbon atoms or said alkyl substituted by one or two hydroxyl groups.

In another embodiment of the invention $R_1$, $R_2$, $R_3$ and $R_4$ are each methyl, or $R_1$ and $R_2$ together and $R_3$ and $R_4$ together are pentamethylene.

Specific oxazolidine compounds of formula Ia, IIa or IIIa which are useful in the instant invention include (a) 3,3-dimethyl-1-oxa-4-azaspiro[4.5]decane,
(b) 2,2,4,4-tetramethyl-1,3-oxazolidine,
(c) 2,2,11,11-tetramethyl-3,9-dioxa-dispiro(4.2.4.2]tetradecane,
(d) 3,3-dimethyl-1-oxa-4-oxyl-4-azaspiro[4.5]decane,
(e) 3,3-dimethyl-1-oxa-4-hydroxy-4-azaspiro[4.5]decane,
(f) 3,3-dimethylol-1-oxa-4-azaspiro[4.5]decane,
(g) 2,3,3-trimethyl-1-oxa-4-azaspiro[4.5]decane,
(h) 3,3-di(2-hydroxyethyl)-1-oxa-4-azaspiro[4.5]decane,
(i) 4-ethyl-2-isopropyloxazolidine,
(j) 1-aza-3,7-dioxa-2,8-diisopropyl-5-ethylbicyclo[3.3.0]octane,
(k) 3-acetyl-4,4-dimethyl-2-(3-amyl)oxazolidine,
(l) 3-acetyl-4-ethyl-2-phenyloxazolidine,
(m) N-(2-hydroxyethyl)-2,2'-diethyl-4,4'-dimethyl-1,3-oxazolidine,
(n) 1-aza-3,7-dioxa-2,8-diphenyl-5-methylolbicyclo[3.3.0]octane, or
(o) 1-aza-3,7-dioxa-2,8-di-n-propyl-5-methylolbicyclo[3.3.0]octane.

Another embodiment of the instant invention is where the oxazolidine compound of component (b)(i) is (a) 3,3-dimethyl-1-oxa-4-azaspiro[4.5]decane,
(b) 2,2,4,4-tetramethyl-1,3-oxazolidine,
(c) 2,2,11,11-tetramethyl-3,9-dioxa-dispiro(4.2.4.2]tetradecane, In another embodiment of the invention, the ratio by weight of (i) to (ii) is from 4:1 to 1:4.

Another embodiment of the invention is where the ratio by weight of (i) to (ii) is from 2:1 to 1:2.

In still another embodiment of the invention, the effective amount of the UV absorber plus the oxazolidine compound in the candle wax is 0.01 to 10% by weight based on the wax.

Another embodiment of the invention is where the effective amount of the UV absorber plus oxazolidine in the candle wax is 0.1 to 2% by weight based on the wax.

Another embodiments of the invention is where the effective amount of the UV absorber plus oxazolidine in the candle wax is 0.1 to 0.5% by weight based on the wax.

The UV absorber of component (ii) is a benzotriazole, a benzophenone, an α-cyanoacrylate, an oxanilide, an s-triazine, a cinnamate, a malonate, a benzoate or a salicylate, or a mixture thereof.

In another embodiment of the invention, the UV absorber is a benzotriazole, a benzophenone or an s-triazine.

Examples of the UV absorbers useful in the instant invention are (a) 4-octyloxy-2-hydroxybenzophenone;
(b) 4-methoxy-2-hydroxybenzophenone;
(c) 2-(2-hydroxy-5-methylphenyl)-2H-benzotriazole;
(d) 2-(2-hydroxy-5-tert-octylphenyl-2H-benzotriazole;
(e) 2-(2-hydroxy-3,5-di-tert-amylphenyl)-2H-benzotriazole;
(f) octyl 3-(benzotriazol-2-yl)-5-tert-butyl-4-hydroxyhydrocinnamate;

(g) 2-(2-hydroxy-3,5-di-tert-butylphenyl)-2H-benzotriazole;
(h) 2-(2-hydroxy-5-tert-butylphenyl)-2H-benzotriazole;
(i) 5-chloro-2-(2-hydroxy-3,5-di-tert-butylphenyl)-2H-benzotriazole;
(j) 5-chloro-2-(2-hydroxy-3-tert-butyl-5-methylphenyl)-2H-benzotriazole;
(k) 2-(2-hydroxy-3-sec-butyl-5-tert-butylphenyl)-2H-benzotriazole;
(l) 2-(2-hydroxy-4-octyloxyphenyl)-2H-benzotriazole;
(m) 2-(2-hydroxy-3-dodecyl-5-methylphenyl)-2H-benzotriazole;
(n) 2-[2-hydroxy-3,5-di($\alpha,\alpha$-dimethylbenzyl)phenyl]-2H-benzotriazole;
(o) 2-[2-hydroxy-3-($\alpha,\alpha$-dimethylbenzyl)-5-tert-octylphenyl]-2H-benzotriazole;
(p) 2-{2-hydroxy-3-tert-butyl-5-[2-(omega-hydroxy-octa (ethyleneoxy)carbonyl)-ethyl]phenyl}-2H-benzotriazole;
(q) 2-{2-hydroxy-3-tert-butyl-5-[2-(octyloxy)carbonyl) ethyl]phenyl}-2H-benzo-triazole.
(r) 2-ethylhexyl p-methoxycinnamate;
(s) 4-methoxy-2,2'-dihydroxybenzophenone;
(t) 4,4'dimethoxy-2,2'-dihydroxybenzophenone;
(u) 2,4-bis(2,4-dimethylphenyl)-6-(2-hydroxy-4-octyloxyphenyl)-s-triazine;
(v) 2,4-diphenyl-6-(2-hydroxy-4-hexyloxyphenyl)-s-triazine;
(w) 2,4-bis(2,4-dimethylphenyl)-6-[2-hydroxy-4-(3-do-/tri-decyloxy-2-hydroxy-propoxy)phenyl]-s-triazine;
(x) 2,4-bis(2,4-dimethylphenyl)-6-[2-hydroxy-4-(3-do-/tri-decyloxy-2-hydroxy-propoxy)-5-$\alpha$-cumylphenyl]-s-triazine;
(y) reaction product of 2,4,6-tris(2,4-dihydroxyphenyl)-s-triazine with octyl $\alpha$-haloacetate; or
(z) the mixture of 3,3;3,5;5,5-methylene-bis[2,4-bis(2,4-dimethyl-phenyl)]-6-[2-hydroxy-4-(3-butyloxy-2-hydroxypropoxyphenyl)]-s-triazine.

Still other examples of UV absorbers useful in the instant invention are
(a) 4-octyloxy-2-hydroxybenzophenone;
(b) 4-methoxy-2-hydroxybenzophenone;
(d) 2-(2-hydroxy-5-tert-octylphenyl-2H-benzotriazole;
(o) 2-[2-hydroxy-3-($\alpha,\alpha$-dimethylbenzyl)-5-tert-octylphenyl]-2H-benzotriazole;
(p) 2-{2-hydroxy-3-tert-butyl-5-[2-(omega-hydroxy-octa (ethyleneoxy)carbonyl)-ethyl]phenyl}-2H-benzotriazole;
(q) 2-{2-hydroxy-3-tert-butyl-5-[2-(octyloxy)carbonyl) ethyl]phenyl}-2H-benzo-triazole;
(y) reaction product of 2,4,6-tris(2,4-dihydroxyphenyl)-s-triazine with octyl $\alpha$-haloacetate; or
(z) the mixture of 3,3;3,5;5,5-methylene-bis[2,4-bis(2,4-dimethyl-phenyl)]-6-[2-hydroxy-4-(3-butyloxy-2-hydroxypropoxyphenyl)]-s-triazine.

Another embodiment of the instant invention involves a composition wherein the antioxidant is a phenolic antioxidant, phosphite, nitrone, amine oxide or hydroxylamine, or mixture thereof.

Examples of the above-embodiment are wherein the effective amount of UV absorber in combination with the oxazolidine compound and an antioxidant is 0.01 to 10% by weight based on the wax.

Another embodiment is where the effective amount of UV absorber in combination with the oxazolidine and an antioxidant is 0.1 to 2% by weight based on the wax.

Still another embodiment is where the effective amount of UV absorber in combination with the oxazolidine and an antioxidant is 0.1 to 0.5% by weight based on the wax.

Examples of the antioxidants useful in this invention are
n-octadecyl 3,5-di-tert-butyl-4-hydroxyhydrocinnamate,
neopentanetetrayl tetrakis(3,5-di-tert-butyl-4-hydroxyhydrocinammate),
di-n-octadecyl 3,5-di-tert-butyl-4-hydroxybenzyl-phosphonate,
1,3,5-tris(3,5-di-tert-butyl-4-hydroxybenzyl) isocyanurate,
thiodiethylene bis(3,5-di-tert-butyl-4-hydroxy-hydrocinnamate),
1,3,5-trimethyl-2,4,6-tris(3,5-di-tert-butyl-4-hydroxybenzyl)benzene,
3,6-dioxaoctamethylene bis(3-methyl-5-tert-butyl-4-hydroxyhydrocinnamate),
2,6-di-tert-butyl-p-cresol,
2,2'-ethylidene-bis(4,6-di-tert-butylphenol),
1,3,5-tris(2,6-dimethyl-4-tert-butyl-3-hydroxybenzyl) isocyanurate,
1,1,3,-tris(2-methyl-4-hydroxy-5-tert-butylphenyl) butane,
1,3,5-tris[2-(3,5-di-tert-butyl-4-hydroxyhydrocinnamoyloxy)ethyl] isocyanurate,
3,5-di-(3,5-di-tert-butyl-4-hydroxybenzyl)mesitol,
hexamethylene bis(3,5-di-tert-butyl-4-hydroxy-hydrocinnamate),
1-(3,5-di-tert-butyl-4-hydroxyanilino)-3,5-di(octylthio)-s-triazine,
N,N'-hexamethylene-bis(3,5-di-tert-butyl-4-hydroxyhydrocinnamamide),
calcium bis(ethyl 3,5-di-tert-butyl-4-hydroxybenzyl-phosphonate),
ethylene bis[3,3-di(3-tert-butyl-4-hydroxyphenyl) butyrate],
octyl 3,5-di-tert-butyl-4-hydroxybenzylmercaptoacetate,
bis(3,5-di-tert-butyl-4-hydroxyhydrocinnamoyl) hydrazide,
N,N-di-($C_{12}$–$C_{24}$alkyl)-N-methyl-amine oxide, or
N,N-dialkylhydroxylamine prepared from di(hydrogenated tallow)amine by direct oxidation.

Still other embodiments of antioxidants useful in the instant invention are
neopentanetetrayl tetrakis(3,5-di-tert-butyl-4-hydroxyhydrocinnamate),
n-octadecyl 3,5-di-tert-butyl-4-hydroxyhydrocinnamate,
1,3,5-trimethyl-2,4,6-tris(3,5-di-tert-butyl-4-hydroxybenzyl)benzene,
1,3,5-tris(3,5-di-tert-butyl-4-hydroxybenzyl) isocyanurate,
2,6-di-tert-butyl-p-cresol, or
2,2'-ethylidene-bis(4,6-di-tert-butylphenol).

It should be noted that candles contain a host of various components. The base materials may be made up of the following:
paraffin wax,
natural oils, polyamide plus fatty acid/ester,
fatty acids such as stearin,
opacifiers,
beeswax,
glycerides plus oxidized wax,
alcohols, and
ethylene oligomers.

Candles also contain a number of additives such as the following:
mold release agents,
fragrances,
insect repellants or insecticides,
hardeners,
crystal modifiers,
clarifiers,
guttering reducers,
colorants,
f.p. control agents,
stretchability improvers,
gelling agents,
extrusion aids, and
vortex reducers.

Each of the various components are meant to control or modify the properties of the candle to insure proper burning, reduce channelling, aid in uniform melting, and the like. The colorants and fragrances obviously are there to provide the proper color, scent or other aesthetic appeal.

Of increasing importance are the transparent gel candles which look like clear glass, but which burn like a classical candle. As is discussed in detail in U.S. Pat. No. 5,879,694, the relevant parts of which are incorporated herein by reference, these gel candles usually contain a copolymer selected from the group consisting of a triblock, radial block, diblock or multiblock copolymer classically made up of at least two thermodynamically incompatible segments containing both hard and soft segments. Typical of such block copolymers is KRATON® (Shell Chemical Co.) which consists of block segments of styrene monomer units and rubber monomer or comonomer units. The most common structure found in KRATON® D series is a linear ABA block with styrene-butadiene-styrene (SBS) or styrene-isoprene-styrene (SIS).

The following examples are meant for illustrative purposes only and are not to be construed to limit the instant invention in any manner whatsoever.

Raw Materials

Wax samples are supplied by the Candle-Lite Corporation. These samples contain dyes and fragrances.

The UV absorbers and hindered amine stabilizers are obtained from the Ciba Speciality Chemicals Corporation.

Sample Preparation

The wax samples obtained from the Candle-Lite Corporation already contain a dye and a fragrance (scent). In these cases, the wax is melted and the appropriate stabilizer(s) is (are) added and dissolved in the molten wax. The stabilized wax is then poured into five (5) 44 mm diameter aluminum pans giving five (5) wax disks.

Sample Exposure

Triplicate samples of each disk are exposed under a bank of six (6) cool-white fluorescent lamps (40 watts) or under a bank of six (6) UV lamps having a wavelength of 368 nm with the test samples being twelve (12) inches (30.48 cm) below the lamps.

Dye color fade (or color change) is measured by a Macbeth ColorEye Spectrophotometer with a 6 inch integrating sphere. The conditions are: 10 degree observer, D65 illuminant and 8 degree viewing angle.

Initial color measurements are taken using the above parameters. The L, a and b values are calculated using the CIE system from the reflectance values. YI is calculated from the L, a and b values. Subsequent measurements are taken at specified intervals. Delta L, a, b and YI values are simply the difference between the initial values and the values at each interval. Delta($\Delta$) E is calculated as follows:

$$[(\text{Delta } L)^2 + (\text{Delta } a)^2 + (\text{Delta } b)^2]^{1/2} = \text{Delta } E.$$

EXAMPLE 1

3,3-Dimethyl-1-oxa-4-azaspiro[4.5]decane

Into a solution of 45 g (460 mmol) of cyclohexanone in 300 mL of toluene is added 35.6 g (400 mmol) of 2-amino-2,2-dimethylethanol. The reaction mixture is then heated to reflux and the by-product water is collected by a Dean-Stark trap. After 16 hours of heating at reflux, the reaction mixture is allowed to cool to ambient temperature and is then concentrated under vacuum to give 55 g of a yellow liquid. The product, identified by mass spectroscopy (m/z=169) is obtained in an 81.4% yield. The structure is confirmed by $^1$Hnmr.

$^1$Hnmr (CDCl$_3$) (300.08 MHz) $\delta$ 1.26 (s, 6H), 1.56–1.60 (m, 10H), 3.59 (s, 2H), 2.22 (s, 1H).

EXAMPLE 2

2,2,4,4-Tetramethyl-1,3-oxazolidine

Into a 500 mL, three-necked flask with a reverse Dean-Stark trap is added 45 g (500 mmol) of 2-amino-2,2-dimethylethanol, 40 g (700 mmol) of acetone and 200 mL of methylene chloride. The reaction mixture is heated to reflux for 16 hours until no starting 2-amino-2,2-dimethylethanol is detected. The reaction mixture is allowed to cool to ambient temperature and is than concentrated under vacuum (200 mm Hg/30° C.) to give 50 g (77.5% yield) of a colorless liquid. The product is identified by mass spectroscopy (m/z=129) and $^1$Hnmr analysis.

$^1$Hnmr (CDCl$_3$) (300.08 MHz) $\delta$ 1.26 (s, 6H), 1.39 (s, 6H), 3.60 (s, 2H), 2.17 (s, 1H).

EXAMPLE 3

2,2,11,11-Tetramethyl-3,9-dioxa-dispiro(4.2.4.2] tetradecane

Into a solution of 40 g (360 mmol) of 1,4-cyclohexanedione in 200 mL of toluene is added 63.5 g (720 mmol) of 2-amino-2,2-dimethylethanol. The reaction mixture is then heated to reflux and the by-product water is collected in a Dean-Stark trap. After 16 hours of heating at reflux, the reaction is allowed to cool to ambient temperature and is then concentrated under vacuum to give 91 g (98.4% yield) of a brownish wet solid. The product is identified by mass spectroscopy (m/z=254) and $^1$Hnmr.

$^1$Hnmr (CDCl$_3$) (300.08 MHz) $\delta$ 1.22 (s, 12H), 1.69 (s, 4H), 1.83 (d, 4H), 3.53 (s, 4H).

EXAMPLE 4

Color Fade of Pink Scented Candle Wax under Fluorescent Lamp Exposure

A variety of different stabilizers are evaluated in pink scented candle wax obtained from the Candle-Lite Corporation under fluorescent lamp exposure. The ΔE values represent the change in color after the indicated days of exposure. A low ΔE value indicates less change in color and is highly desired.

| Sample* (wt % add) | ΔE after 30 days |
|---|---|
| Blank (no add) | 14.47 |
| A (0.3%) | 10.47 |
| D (0.3%) | 10.00 |
| B (0.15%) + C (0.15%) | 8.93 |
| B (0.15%) + D (0.15%) | 3.42 |
| F (0.15%) + C (0.15%) | 3.11 |
| G (0.15%) + E (0.15%) | 3.10 |
| F (0.15%) + H (0.15%) | 2.20 |

*A is octyl 3-(benzotriazol-2-yl)-5-tert-butyl-4-hydroxyhydrocinnamate, TINUVIN ® 384, CIBA.
B is 2-(2-hydroxy-5-tert-octylphenyl)-2H-benzotriazole, TINUVIN ® 329, CIBA.
C is 4-octyloxy-2-hydroxybenzophenone, CHIMMASORB ® 81, CIBA.
D is bis(1,2,2,6,6-pentamethylpiperidin-4-yl) sebacate, TINUVIN ® 292, CIBA.
E is 2-(2-hydroxy-3-α-cumyl-5-tert-octylphenyl)-2H-benzotriazole, TINUVIN ® 928, CIBA.
F is 3,3-dimethyl-1-oxa-4-azaspiro[4.5]decane, the compound of instant Example 1.
G is 2,2,4,4-tetramethyl-1,3-oxazolidine, the compound of instant Example 2.
H is 2,4-bis(2,4-dimethylphenyl)-6-[2-hydroxy-4-(3-octyl/nonyl/decyloxy-2-hydroxy-propoxy)-5-α-cumylphenyl]-s-triazine.

These data show that an oxazolidine compound (Compound F or G) in combination with a UV absorber protects the pink scented candle wax from unwanted discoloration far better than conventional stabilizer systems.

EXAMPLE 5

Color Fade of Pink Scented Candle Wax Under UV Lamp Exposure

A variety of different stabilizers are evaluated in pink scented candle wax obtained from the Candle-Lite Corporation under UV lamp exposure. The ΔE values represent the change in color after the indicated days of exposure. A low ΔE value indicates less change in color and is highly desired.

| Sample* (wt % add) | ΔE after 32 days |
|---|---|
| Blank (no add) | 21.10 |
| D (0.3%) | 16.24 |
| B (0.15%) + C (0.15%) | 11.15 |
| A (0.15%) + D (0.15%) | 9.84 |
| F (0.15%) + H (0.15%) | 5.97 |
| F (0.15%) + | 4.73 |
| C (0.15%) + G (0.15%) + E (0.15%) | 2.88 |

*A is octyl 3-(benzotriazol-2-yl)-5-tert-butyl-4-hydroxyhydrocinnamate, TINUVIN ® 384, CIBA.
B is 2-(2-hydroxy-5-tert-octylphenyl)-2H-benzotriazole, TINUVIN ® 329, CIBA.
C is 4-octyloxy-2-hydroxybenzophenone, CHIMMASORB ® 81, CIBA.
D is bis(1,2,2,6,6-pentamethylpiperidin-4-yl) sebacate, TINUVIN ® 292, CIBA.
E is the reaction product of 2,4,6-tris(2,4-dihydroxyphenyl)-s-triazine with octyl α-haloacetate.
F is 3,3-dimethyl-1-oxa-4-azaspiro[4.5]decane, the compound of instant Example 1.
G is 2,2,4,4-tetramethyl-1,3-oxazolidine, the compound of instant Example 2.
H is 2,4-bis(2,4-dimethylphenyl)-6-[2-hydroxy-4-(3-octyl/nonyl/decyloxy-2-hydroxy-propoxy)-5-α-cumylphenyl]-s-triazine.

These data show that an oxazolidine compound (Compound F or G) in combination with a UV absorber protects the pink scented candle wax from unwanted discoloration far better than conventional stabilizer systems.

EXAMPLE 6

Color Fade of Gray Scented Candle Wax Under Fluorescent Lamp Exposure

A variety of different stabilizers are evaluated in gray scented candle wax obtained from the Candle-Lite Corporation under fluorescent lamp exposure. The ΔE values represent the change in color after the indicated days of exposure. A low ΔE value indicates less change in color and is highly desired.

| Sample* (wt % add) | ΔE after 24 days |
|---|---|
| Blank (no add) | 16.22 |
| A (0.3%) | 10.36 |
| B (0.15%) + C (0.15%) | 9.22 |
| F (0.15%) + H (0.15%) | 6.22 |

*A is octyl 3-(benzotriazol-2-yl)-5-tert-butyl-4-hydroxyhydrocinnamate, TINUVIN ® 384, CIBA.
B is 2-(2-hydroxy-5-tert-octylphenyl)-2H-benzotriazole, TINUVIN ® 329, CIBA.
C is 4-octyloxy-2-hydroxybenzophenone, CHIMMASORB ® 81, CIBA.
F is 3,3-dimethyl-1-oxa-4-azaspiro[4.5]decane, the compound of instant Example 1.
H is 2,4-bis(2,4-dimethylphenyl)-6-[2-hydroxy-4-(3-octyl/nonyl/decyloxy-2-hydroxy-propoxy)-5-α-cumylphenyl]-s-triazine.

These data show that an oxazolidine compound (Compound F) in combination with an s-triazine UV absorber protects the gray scented candle wax from unwanted discoloration far better than conventional stabilizer systems.

EXAMPLE 7

Color Fade of Gray Scented Candle Wax Under UV Lamp Exposure

A variety of different stabilizers are evaluated in gray scented candle wax obtained from the Candle-Lite Corporation under fluorescent lamp exposure. The ΔE values represent the change in color after the indicated days of exposure. A low ΔE value indicates less change in color and is highly desired.

| Sample* (wt % add) | ΔE after 23 days |
|---|---|
| Blank (no add) | 30.07 |
| B (0.15%) + C (0.15%) | 10.96 |
| G (0.15%) + E (0.15%) | 8.13 |

*B is 2-(2-hydroxy-5-tert-octylphenyl)-2H-benzotriazole, TINUVIN ® 329, CIBA.
C is 4-octyloxy-2-hydroxybenzophenone, CHIMMASORB ® 81, CIBA.
E is 2-(2-hydroxy-3-α-cumyl-5-tert-octylphenyl)-2H-benzotriazole, TINUVIN ® 928, CIBA.
G is 2,2,4,4-tetramethyl-1,3-oxazolidine, the compound of instant Example 2.

These data show that an oxazolidine compound (Compound G) in combination with a benzotriazole UV absorber protects the gray scented candle wax from unwanted discoloration far better than conventional stabilizer systems.

EXAMPLE 8

Green scented candle wax is well stabilized by 0.2% by weight of dimethyl p-methoxybenzylidenemalonate, SANDUVOR® PR 25, in combination with 0.2% by weight of 3,3-dimethyl-l-oxa-4-azaspiro[4.5]decane.

EXAMPLE 9

Yellow scented candle wax is well stabilized by 0.1% by weight of di( 1,2,2,6,6-penta methylpiperidin-4-yl) p-methoxybenzylidenemalonate, SANDUVOR® PR31, in combination with 0.1% by weight of 2,2,4,4-tetramethyl-1,3-oxazolidine.

EXAMPLE 10

Red unscented candle wax is well stabilized by 0.1% by weight of dimethyl di(p-chlorophenyl)methylenemalonate in combination with 0.1% by weight of 2,2,11,11-tetramethyl-3,9-dioxa-dispiro(4.2.4.2]tetradecane.

EXAMPLE 11

Red unscented candle wax is well stabilized by 0.2% by weight of dimethyl di(p-methoxyphenyl) methylenemalonate in combination with 0.2% by weight of 3,3-dimethyl-1-oxa-4-oxyl-4-azaspiro[4.5]decane.

EXAMPLE 12

Red unscented candle wax is well stabilized by 0.1% by weight of 4,4'-dimethoxy-2,2'-dihydroxybenzophenone in combination with 0.1% by weight of 3,3-dimethyl-1-oxa-4-hydroxy-4-azaspiro[4.5]decane.

EXAMPLE 13

Red unscented candle wax is well stabilized by 0.2% by weight of 4-tert-butyl-phenyl 2-hydroxybenzoate in combination with 0.1% by weight of 3,3-dimethylol-1-oxa-4-azaspiro[4.5]decane.

EXAMPLE 14

Yellow unscented candle wax is well stabilized by 0.2% by weight of 2-ethoxy-2-ethyloxanilide in combination with 0.1% by weight of 2,3,3-trimethyl-1-oxa-4-azaspiro-[4.5]decane.

EXAMPLE 15

Yellow unscented candle wax is well stabilized by 0.2% by weight of 3-hydroxy-phenyl benzoate in combination with 0.2% by weight of 3,3-di(2-hydroxyethyl)-1-oxa-4-azaspiro[4.5]decane.

EXAMPLE 16

Blue unscented candle wax is well stabilized by 0.2% by weight of dodecyl 3-phenyl-3-methyl-α-cyanoacrylate in combination with 0.1% by weight of 4-ethyl-2-isopropyloxazolidine.

EXAMPLE 17

Blue unscented candle wax is well stabilized by 0.2% by weight of dodecyl 3,3-diphenyl-α-cyanoacrylate in combination with 0.2% by weight of 1-aza-3,7-dioxa-2,8-diisopropyl-5-ethylbicyclo[3.3.0]octane.

EXAMPLE 18

Yellow scented candle wax is well stabilized by 0.2% by weight of 2-{2-hydroxy-3-tert-butyl-5-[2-(omega-hydroxy-octa(ethyleneoxy)carbonyl)ethyl]phenyl}-2H-benzotriazole, 7 TINUVIN® 1130, CIBA, in combination with 2% by weight of 3-acetyl-4,4-dimethyl-2-(3-amyl)oxazolidine.

EXAMPLE 19

Yellow scented candle wax is well stabilized by 0.1% by weight of 2-[2-hydroxy-3-(α,α-dimethylbenzyl)-5-tert-octylphenyl]-2H-benzotriazole, TINUVIN® 928, CIBA, in combination with 0.2% by weight of 3-acetyl-4-ethyl-2-phenyloxazolidine.

EXAMPLE 20

Red scented candle wax is well stabilized by 0.1% by weight of 5-chloro-2-(2-hydroxy-3-tert-butyl-5-methylphenyl)-2H-benzotriazole, TINUVIN® 326, CIBA, in combination with 0.1% by weight of N-(2-hydroxyethyl)-2,2'-diethyl-4,4'-dimethyl-1,3-oxazolidine.

EXAMPLE 21

Green scented candle wax is well stabilized by 0.1% by weight of octyl 3-(benzo-triazol-2-yl)-5-tert-butyl-4-hydroxyhydrocinnamate, TINUVIN® 384, CIBA, in combination with 0.1% by weight of 1-aza-3,7-dioxa-2,8-diphenyl-5-methylolbicylo-[3.3.0]octane.

EXAMPLE 22

Green scented candle wax is well stabilized by 0.1% by weight of octyl 3-(benzo-triazol-2-yl)-5-tert-butyl-4-hydroxyhydrocinnamate, TINUVIN® 384, CIBA, in combination with 0.1% by weight of 1-aza-3,7-dioxa-2,8-di-n-propyl-5-methylolbicyclo-[3.3.0]octane.

EXAMPLE 23

Blue scented candle wax is well stabilized by 0.1% by weight of 2-(2-hydroxy-5-tert-octylphenyl-2H-benzotriazole, TINUVIN® 329, CIBA, in combination with 0.1% by weight of 3,3-dimethyl-1-oxa-4-hydroxy-4-azaspiro[4.5]decane.

EXAMPLE 24

Blue scented candle wax is well stabilized by 0.2% by weight of 4-octyloxy-2-hydroxybenzophenone in combination with 0.1% by weight of 3,3-dimethyl-1-oxa-4-azaspiro[4.5]decane.

EXAMPLE 25

Red unscented candle wax is well stabilized by 0.2% by weight of 2-ethylhexyl p-methoxycinnamate in combination with 0.1% by weight of 2,2,4,4-tetramethyl-1,3-oxazolidine.

EXAMPLE 26

Red unscented candle wax is well stabilized by 0.1% by weight of 4,4'-dimethoxy-2,2'dihydroxybenzophenone in combination with 0.1% by weight of 1-aza-3,7-dioxa-2,8-di-n-propyl-5-methylolbicyclo[3.3.0]octane.

EXAMPLE 27

Yellow unscented candle wax is well stabilized by 0.1% by weight of 2-ethoxy-2'-ethyl-5,4'-di-tert-butyloxanilide in combination with 0.1% by weight of 2,2,11,11-tetra-methyl-3,9-dioxa-dispiro(4.2.4.2)tetradecane.

EXAMPLE 28

Yellow unscented candle wax is well stabilized by 0.1% by weight of 2,4-bis(2,4-dimethylphenyl)-6-[2-hydroxy-4-(3-do-/tri-decyloxy-2-hydroxypropoxy)-phenyl]-s-triazine, TINUVIN® 400, CIBA, in combination with 0.1% by weight of 3-acetyl-4,4-dimethyl-2-(3-amyl)oxazolidine.

EXAMPLE 29

Blue scented candle wax is well stabilized by 0.1% by weight of 2,4-bis(2,4-dimethylphenyl)-6-[2-hydroxy-4-(3-do-/tri-decyloxy-2-hydroxypropoxy)-5-α-cumylphenyl]-s-triazine in combination with 0.1% by weight of 4-ethyl-2-isopropyl-oxazolidine.

EXAMPLE 30

Blue unscented candle wax is well stabilized by 0.2% by weight of 2,4-bis-(2,4-dimethylphenyl)-6-(2-hydroxy-4-octyloxyphenyl)-s-triazine in combination with 0.1% by weight of 1-acetyl-2,2,6,6-tetramethyl-4,4-(1-oxa-2,4-dioxo-3-dodecylimino-tetramethylene)piperidine, TINUVIN® 440, CIBA, and 0.1% by weight of 1-aza-3,7-dioxa-2,8-di-n-propyl-5-methylolibicyclo[3.3.0]octane.

EXAMPLE 31

Blue unscented candle wax is well stabilized by 0.1% by weight of 2,4-bis(2,4-dimethylphenyl-6-[2-hydroxy-4-(3-do-/tri-decloxy-2-hydroxypropoxy)-phenyl]-s-triazine, TINUVIN® 400, CIBA, in combination with 0.1% by weight of bis(1,2,2,6,6-pentamethylpiperidin-4-yl) sebacate, TINUVIN® 292, CIBA, and 0.1% by weight of 2,2,4,4-tetramethyl-1,3-oxazolindine.

EXAMPLE 32

White unscented candle wax is well stabilized by 0.1% by weight of 4-tert-octyl-phenyl-2-hydroxybenzoate in combination with 2% by weight of 2,2,11,11-tetramethyl-3,9-dioxa-dispiro(4.2.4.2)tetradecane.

EXAMPLE 33

White unscented candle wax is well stabilized by 0.1% by weight of 3-hydroxy-phenyl benzoate in combination with 0.1% by weight of octyl 3-(benzotriazol-2yl)-5-tert-butyl-4-hydroxyhydrocinnamate, TINUVIN® 384, CIBA, and 0.1% by weight of 3,3-dimethyl-1-oxa-4-hydroxy-4-azaspiro[4.5] decane.

EXAMPLE 34

Yellow scented candle wax is well stabilized by 0.1% by weight of dodecyl 3,3-diphenyl-α-cyanoacrylate in combination with 0.1% by weight of 2,4-bis(2,4-dimethylphenyl)-6-[2-hydroxy-4-(3-do-/tri-decyloxy-2-hydroxypropoxy)-phenyl]-s-triazine, TINUVIN® 400, CIBA, and 0.1% by weight of 2,2,4,4-tetramethyl-1,3-oxazolidine.

EXAMPLE 35

Yellow scented candle wax is well stabilized by 0.1% by weight of pentaerythrityl tetrakis[3,3-diphenyl-α-cyanoacrylate] in combination with 0.2% by weight of 3-acetyl-4-ethyl-2-phenyloxazolidine.

EXAMPLE 36

Red scented candle wax is well stabilized by 0.2% by weight of octyl 3-(p-methoxyphenyl)-3-phenyl-α-cyanoacrylate in combination with 0.2% by weight of 1-aza-3,7-dioxa-2,8-diphenyl-5-methylolbicyclo[3.3.0]octane.

What is claimed is:

1. A composition which consists essentially of
   (a) candle wax which is white and unscented; white and scented; dyed and unscented; dyed and scented; dipped and unscented; or dipped and scented, and
   (b) an effective stabilizing amount of a combination of
      (i) an oxazolidine compound and
      (ii) a UV absorber or an antioxidant, or a UV absorber and an antioxidant,
   wherein the ratio by weight of (i) to (ii) is from 10:1 to 1:10, and
   wherein the oxazolidine compound is of the formula (Ia), (IIa) or (IIIa)

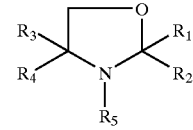

(Ia)

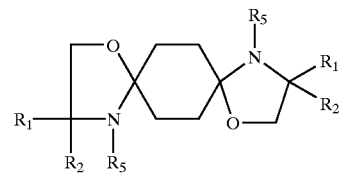

(IIa)

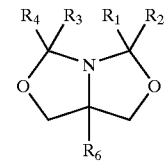

(IIIa)

where
   $R_1$, $R_2$, $R_3$ and $R_4$ are independently alkyl of 1 to 8 carbon atoms, or $R_1$ and $R_2$ together or $R_3$ and $R_4$ together are tetramethylene, pentamethylene or pentamethylene substituted by methyl;
   $R_5$ is hydrogen, oxyl, hydroxyl, aralkyl of 7 to 15 carbon atoms, alkoxy of 1 to 24 carbon atoms, alkyl of 1 to 42 carbon atoms, said alkyl substituted by one or two hydroxyl groups, said alkyl substituted by alkylcarbonyloxy of 2 to 18 carbon atoms, or said alkyl interrupted by one to twenty oxygen atoms and substituted by one hydroxyl, by alkylcarbonyloxy of 2 to 18 carbon atoms or by 4-hydroxy-3,5-di-tert-butylbenzoyloxy or $R_5$ is —CO—$C_nH_{2n+1}$ where n is 1 to 17, and R₆ is alkyl of 1 to 8 carbon atoms, said alkyl substituted by one or two hydroxyl groups, or is aryl of 6 to 10 carbon atoms.

2. A composition according to claim 1 wherein the composition also contains an antioxidant.

3. A composition according to claim 1 where in the compound of formula (Ia), (IIa) or (IIIa), $R_1$, $R_2$, $R_3$ and $R_4$ are each methyl, or $R_1$ and $R_2$ together and $R_3$ and $R_4$ together are pentamethylene.

4. A composition according to claim 1 wherein the oxazolidine compound of formula (Ia), (IIa) or (IIIa) is
   (a) 3,3-dimethyl-1-oxa-4-azaspiro[4.5]decane,
   (b) 2,2,4,4-tetramethyl-1,3-oxazolidine,
   (c) 2,2,11,11-tetramethyl-3,9-dioxa-dispiro(4.2.4.2] tetradecane,
   (d) 3,3-dimethyl-1-oxa-4-oxyl-4-azaspiro[4.5]decane,
   (e) 3,3-dimethyl-1-oxa-4-hydroxy-4-azaspiro[4.5]decane,
   (f) 3,3-dimethylol-1-oxa-4-azaspiro[4.5]decane,
   (g) 2,3,3-trimethyl-1-oxa-4-azaspiro[4.5]decane,
   (h) 3,3-di(2-hydroxyethyl)-1-oxa-4-azaspiro[4.5]decane,
   (i) 4-ethyl-2-isopropyloxazolidine,
   (j) 1-aza-3,7-dioxa-2,8-diisopropyl-5-ethylbicyclo[3.3.0]octane,
   (k) 3-acetyl-4,4-dimethyl-2-(3-amyl)oxazolidine,
   (l) 3-acetyl-4-ethyl-2-phenyloxazolidine,
   (m) N-(2-hydroxyethyl)-2,2'-diethyl-4,4'-dimethyl-1,3-oxazolidine,
   (n) 1-aza-3,7-dioxa-2,8-diphenyl-5-methylolbicyclo[3.3.0]octane, or
   (o) 1-aza-3,7-dioxa-2,8-di-n-propyl-5-methylolbicyclo[3.3.0]octane.

5. A composition according to claim 4 wherein the oxazolidine compound is
   (a) 3,3-dimethyl-1-oxa-4-azaspiro[4.5]decane,
   (b) 2,2,4,4-tetramethyl-1,3-oxazolidine, or
   (c) 2,2,11,11-tetramethyl-3,9-dioxa-dispiro(4.2.4.2] tetradecane.

6. A composition according to claim 1 wherein the ratio by weight of (i) to (ii) is from 4:1 to 1:4.

7. A composition according to claim 6 wherein the ratio by weight of (i) to (ii) is from 2:1 to 1:2.

8. A composition according to claim 1 wherein the effective amount of the UV absorber plus the oxazolidine compound in the candle wax is 0.01 to 10% by weight based on the wax.

9. A composition according to claim 8 wherein the effective amount of the UV absorber plus oxazolidine in the candle wax is 0.1 to 2% by weight based on the wax.

10. A composition according to claim 9 wherein the effective amount of the UV absorber plus oxazolidine in the candle wax is 0.1 to 0.5% by weight based on the wax.

11. A composition according to claim 1 wherein the UV absorber of component (ii) is a benzotriazole, a benzophenone, an α-cyanoacrylate, an oxanilide, an s-triazine, a cinnamate, a malonate, a benzoate or a salicylate, or a mixture thereof.

12. A composition according to claim 11 wherein the UV absorber is a benzotriazole, a benzophenone or an s-triazine.

13. A composition according to claim 11 wherein the UV absorber is
   (a) 4-octyloxy-2-hydroxybenzophenone;
   (b) 4-methoxy-2-hydroxybenzophenone;
   (c) 2-(2-hydroxy-5-methylphenyl)-2H-benzotriazole;
   (d) 2-(2-hydroxy-5-tert-octylphenyl-2H-benzotriazole;
   (e) 2-(2-hydroxy-3,5-di-tert-amylphenyl)-2H-benzotriazole;
   (f) octyl-3-(benzotriazol-2-yl)-5-tert-butyl-4-hydroxyhydrocinnamate;
   (g) 2-(2-hydroxy-3,5-di-tert-butylphenyl)-2H-benzotriazole;
   (h) 2-(2-hydroxy-5-tert-butylphenyl)-2H-benzotriazole;
   (i) 5-chloro-2-(2-hydroxy-3,5-di-tert-butylphenyl)-2H-benzotriazole;
   (j) 5-chloro-2-(2-hydroxy-3-tert-butyl-5-methylphenyl)-2H-benzotriazole;
   (k) 2(2-hydroxy-3-sec-butyl-5-tert-butylphenyl)-2H-benzotriazole;
   (l) 2-(2-hydroxy-4-octyloxyphenyl)-2H-benzotriazole;
   (m) 2-(2-hydroxy-3-dodecyl-5-methylphenyl)-2H-benzotriazole;
   (n) 2-[2-hydroxy-3,5-di(α,α-dimethylbenzyl)phenyl]-2H-benzotriazole;
   (o) 2-[2-hydroxy-3-(α,α-dimethylbenzyl)-5-tert-octylphenyl]-2H-benzotriazole;
   (p) 2-{2-hydroxy-3-tert-butyl-5-[2-omega-hydroxy-octa (ethyleneoxy)carbonyl)ethyl]phenyl}-2H-benzotriazole;
   (q) 2-{2-hydroxy-3-tert-butyl-5-[2-(octyloxy)carbonyl) ethyl]phenyl}-2H-benzotriazole;
   (r) 2-ethylhexyl p-methoxycinnamate;
   (s) 4-methoxy-2,2'-dihydroxybenzophenone;
   (t) 4,4-dimethoxy-2,2'-dihydroxybenzophenone;
   (u) 2,4-bis(2,4-dimethylphenyl)-6-(2-hydroxy-4-octyloxyphenyl)-s-triazine;
   (v) 2,4-diphenyl-6-(2-hydroxy-4-hexyloxyphenyl)-s-triazine;
   (w) 2,4-bis(2,4-dimethylphenyl)-6-[2-hydroxy-4-(3-do-/tri-decyloxy-2-hydroxypropoxy)phenyl]-s-triazine;
   (x) 2,4-bis(2,4-dimethylphenyl)-6-[2-hydroxy-4-(3-do/tri-decyloxy-2-hydroxypropoxy)-5-α-cumylphenyl]-s-triazine;
   (y) reaction product of 2,4,6-tris(2,4-dihydroxyphenyl)-s-triazine with octyl α-haloacetate; or
   (z) the mixture of 3,3;3,5;5,5-methylene-bis[2,4-bis(2,4-dimethylphenyl)]-6-[2-hydroxy-4-(3-butyloxy-2-hydroxypropoxyphenyl)]-s-triazine.

14. A composition according to claim 13 wherein the UV absorber is
   (a) 4-octyloxy-2-hydroxybenzophenone;
   (b) 4-methoxy-2-hydroxybenzophenone;
   (d) 2-(2-hydroxy-5-tert-octylphenyl-2H-benzotriazole;
   (o) 2-[2-hydroxy-3-(α,α-dimethylbenzyl)-5-tert-octylphenyl]-2H-benzotriazole;
   (p) 2-{2-hydroxy-3-tert-butyl-5-[2-(omega-hydroxy-octa (ethyleneoxy)carbonyl)-ethyl]phenyl}-2H-benzotriazole;
   (q) 2-{2-hydroxy-3-tert-butyl-5-[2-(octyloxy)carbonyl) ethyl]phenyl }-2H-benzo-triazole;
   (y) reaction product of 2,4,6-tris(2,4-dihydroxyphenyl)-s-triazine with octyl α-haloacetate; or
   (z) the mixture of 3,3;3,5;5,5-methylene-bis[2,4-bis(2,4-dimethyl-phenyl)]-6-[2-hydroxy-4-(3-butyloxy-2-hydroxypropoxyphenyl)]-s-triazine.

15. A composition according to claim 2 wherein the antioxidant is n-octadecyl 3,5-di-tert-butyl-4-hydroxyhydrocinnamate,
neopentanetetrayl tetrakis(3,5-di-tert-butyl-4-hydroxyhydrocinnammate),
di-n-octadecyl 3,5-di-tert-butyl-4-hydroxybenzylphosphonate,
1,3,5-tris(3,5-di-tert-butyl-4-hydroxybenzyl) isocyanurate,
thiodiethylene bis(3,5-di-tert-butyl-4-hydroxyhydrocinnamate),
1,3,5-trimethyl-2,4,6-tris(3,5-di-tert-butyl-4-hydroxybenzyl)benzene,
3,6-dioxaoctamethylene bis(3-methyl-5-tert-butyl-4-hydroxyhydrocinnamate),
2,6-di-tert-butyl-p-cresol,
2,2'-ethylidene-bis(4,6-di-tert-butylphenol),
1,3,5-tris(2,6-dimethyl-4-tert-butyl-3-hydroxybenzyl) isocyanurate,
1,1,3,-tris(2-methyl-4-hydroxy-5-tert-butylphenyl) butane,
1,3,5-tris[2-(3,5-di-tert-butyl-4-hydroxyhydrocinnamoyloxy)ethyl] isocyanurate,
3,5-di-(3,5-di-tert-butyl-4-hydroxybenzyl)mesitol,
hexamethylene bis(3,5-di-tert-butyl-4-hydroxyhydrocinnamate),
1-(3,5-di-tert-butyl-4-hydroxyanilino)-3,5-di(octylthio)-s-triazine,
N,N'-hexamethylene-bis(3,5-di-tert-butyl-4-hydroxyhydrocinnamamide),
calcium bis(ethyl 3,5-di-tert-butyl-4-hydroxybenzylphosphonate),
ethylene bis[3,3-di(3-tert-butyl-4-hydroxyphenyl) butyrate],
octyl 3,5-di-tert-butyl-4-hydroxybenzylmercaptoacetate,
bis(3,5-di-tert-butyl-4-hydroxyhydrocinnamoyl) hydrazide,
N,N'-bis[2-(3,5-di-tert-butyl-4-hydroxyhydrocinnamoyloxy)-ethyl]oxamide,
N,N-di-($C_{14}$–$C_{24}$alkyl)-N-methylamine oxide, or
N,N-dialkylhydroxylamine prepared from di(hydrogenated tallow)amine by direct oxidation.

16. A composition according to claim 2 wherein the antioxidant is a phenolic antioxidant, phosphite, nitrone, amine oxide or hydroxylamine, or mixture thereof.

17. A composition according to claim 1 wherein the effective amount of UV absorber in combination with the oxazolidine and an antioxidant is 0.01 to 10% by weight based on the wax.

18. A composition according to claim 17 wherein the effective amount of UV absorber in combination with the oxazolidine and an antioxidant is 0.1 to 2% by weight based on the wax.

19. A composition according to claim 18 wherein the effective amount of UV absorber in combination with the oxazolidine and an antioxidant is 0.1 to 0.5% by weight based on the wax.

20. A composition according to claim 15 wherein the antioxidant is
neopentanetetrayl tetrakis(3,5-di-tert-butyl-4-hydroxyhydrocinnamate),
n-octadecyl 3,5-di-tert-butyl-4-hydroxyhydrocinnamate,
1,3,5-trimethyl-2,4,6-tris(3,5-di-tert-butyl-4-hydroxybenzyl)benzene,
1,3,5-tris(3,5-di-tert-butyl-4-hydroxybenzyl) isocyanurate,
2,6-di-tert-butyl-p-cresol, or
2,2'-ethylidene-bis(4,6-di-tert-butylphenol).

* * * * *